Feb. 24, 1953 — F. M. BROWN ET AL — 2,629,759
OUTER COVER FOR BATTERIES
Filed Aug. 11, 1949
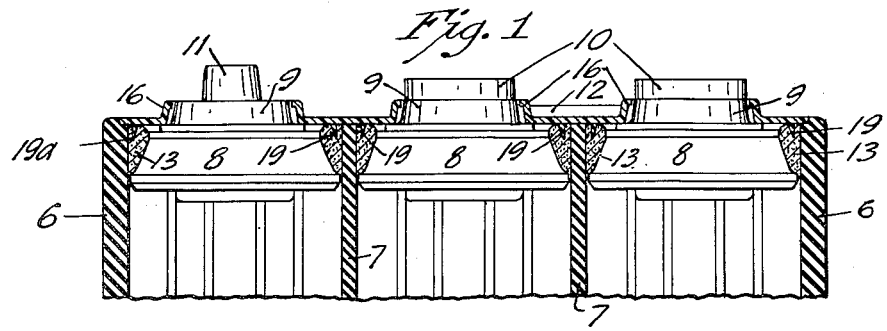
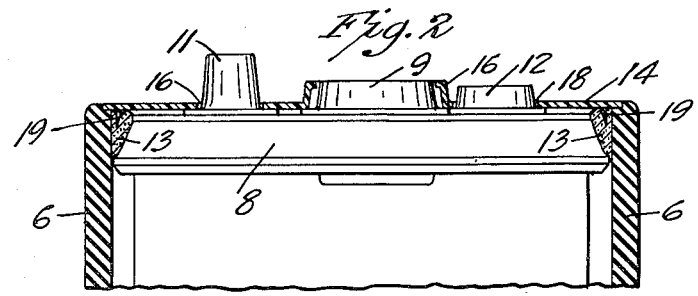
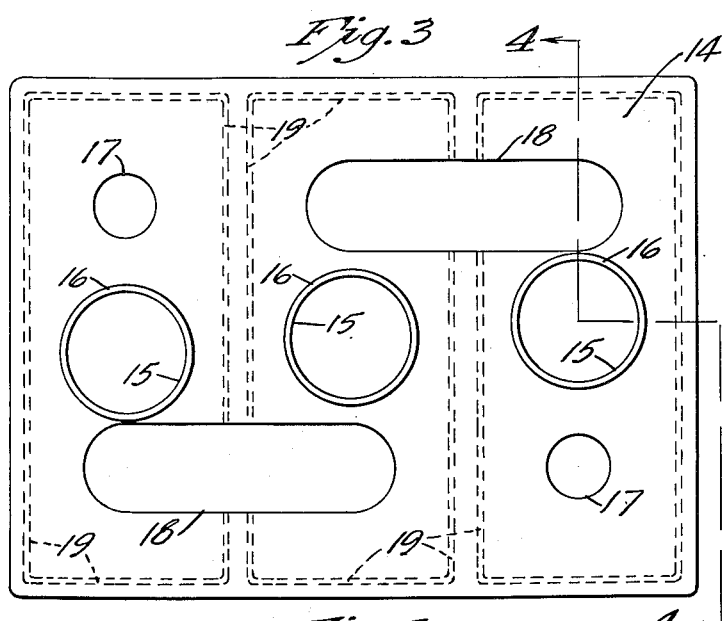
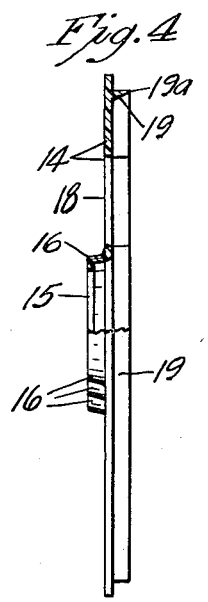
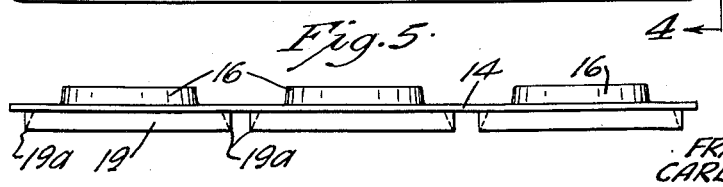
Inventors
FRANK M. BROWN
CARL F. ALBRECHT
By John E. Thysen
Attorney Patented Feb. 24, 1953

2,629,759

UNITED STATES PATENT OFFICE 2,629,759

OUTER COVER FOR BATTERIES

Frank M. Brown and Carl F. Albrecht, St. Paul, Minn., assignors to Gould-National Batteries, Inc., St. Paul, Minn., a corporation of Delaware Application August 11, 1949, Serial No. 109,718

1 Claim. (Cl. 136—170)

This invention relates to outer covers for electric storage batteries and particularly to a cover providing a smooth, continuous top surface adapted to facilitate the removal of accumulations of foreign matter such as dirt, spray of acid from the vent plugs and products of corrosion having a tendency to short circuit the battery.

It is an object of our invention to provide an unusually compact and inexpensive cover of this class affording the desired readily cleanable surface without in any way interfering with the installation, use or testing of the battery.

A further and particular object is to provide an outer cover with pendant flanges disposed to penetrate and adhere to the sealing compound holding the inner cover or cover members in place whereby the outer cover is securely held in place and sealed at its margins in relation to the battery container walls and inner cover member or members.

The invention will be best understood by reference to the accompanying drawing in which:

Figure 1 is a central longitudinal sectional view showing one of our improved covers in place on a battery of common type, the container of which is shown in fragmentary vertical section and the inner cover members and vent plugs of which are shown in elevation;

Fig. 2 is a similar part elevational and part sectional view taken at right angles to the section shown in Fig. 1 and approximately along the center line of one of the battery cells;

Fig. 3 is a top plan view showing one of our improved covers separate from the battery;

Fig. 4 is a part end view and part sectional view of the cover, taken approximately on the line 4—4 of Fig. 3, and Fig. 5 is a side elevational view of the cover.

Figs. 1 and 2 show our improved cover in place on a storage battery container of the common three cell type having walls 6, inter-cell partitions 7 and inner cover members 8 for the individual cells. Each of these covers is formed with an upwardly projecting boss 9 adapted to receive a removable vent and filling plug 10 of common type. The internal elements of the battery, including the electrodes or plates and separators, have been omitted from Figs. 1 and 2 since their construction does not affect the operation of our invention. The vent plug 10 has also been omitted from the left hand cell shown in Fig. 1 and from Fig. 2. Terminal posts 11 project upward from the end cell covers for making electric circuit connections with the battery and the electrodes of the several cells are connected in series by inter-cell connectors 12 also of common type, constituting the common terminals of the respective end cells and central cell. A continuous body 13 of sealing compound extends around the margin of each of the inner cover members 8 to fasten the covers in place and to seal the joints between the covers and container walls 6 and also between the covers and cell partitions 7. This compound, according to present commercial practice, may be of the thermo-plastic type such as a suitable asphaltic composition.

Our improved outer cover is preferably molded in one piece from suitable synthetic resin or plastic material, e. g. polystyrene or methyl methacrylate. It comprises a substantially flat panel 14 which fits in a recess formed in the upper edges of the container walls 6 so that the upper surface of the panel 14 is flush with the upper edge surfaces of the walls 6. Openings 15 are formed in the panel 14 to receive the several bosses 9 and to allow the plugs 10 to project above the cover and annular flanges 16 project above the top surface of the panel 14 to enclose the peripheries of the bosses 9. Additional circular openings 17 are formed in the cover panel 14 to receive the battery terminal posts 11 and to allow them to project above the cover. To allow access to the intercell connectors 12 for testing purposes, elongated openings 18 are formed in the panel 14 at suitable locations.

Integral pendant flanges 19 are formed on the cover panel 14 to penetrate the several bodies 13 of sealing compound extending around the margins of the cell cover members 8 and to adhere thereto for securely fastening the outer cover in place. As best shown in Fig. 3, the flanges 19 are continuous around the perimeter of each cell cover 8, except where interrupted by the openings 18 for the inter-cell connectors 12. The flanges 19 are wedge shaped in cross section and have sharp lower edges 19a disposed to register with the bodies of sealing compound and to be imbedded therein.

Our improved cover is installed after the battery has been assembled in the usual manner and while the bodies 13 of sealing compound are still in a plastic condition. The pendant flanges 19 are merely placed in registry with the bodies 13 of sealing compound and then by downward pressure on the panel 14 its margins are caused to rest on the walls 6 in the recesses formed therein and the flanges 19 are completely submerged in the sealing compound. Thereafter, when the sealing compound sets or cools and hardens, the flanges 19 are firmly held therein to thereby securely fasten the outer cover in place, leaving the battery terminals, inter-cell straps and vent plug openings accessible.

It will thus be evident that the installation of our improved cover requires a minimum of effort and time and being constructed from a unitary, thin body of molded plastic material, the total cost of providing the cover is nominal. It in no way interferes with the installation, testing or use of the battery and affords a smooth top surface flush with the upper edges of the container walls. A distinct advantage is derived from the fact that our cover does not increase the overall dimensions of the battery. Our invention is therefore adapted for use on batteries of the maximum size and capacity which will fit in the available space in an automotive vehicle or wherever the battery is to be used. It greatly facilitates the operation of periodically removing deposits of foreign matter which would otherwise accumulate and cause short circuiting of the battery or one or more of its several cells.

Having described our invention, what we claim as new and desire to protect by Letters Patent is:

For a battery having a plurality of cells separated by inter-cell partitions within outer container walls, an inner cover member for each cell, a continuous marginal body of sealing compound sealing each of said inner cover members in relation to said partitions and walls, each of said cells having a vent plug boss projecting upward from its inner cover member, a unitary outer cover comprising a panel having an upper surface disposed in a common plane with the upper edges of said walls, said panel fitting in recesses formed in said walls and having openings to receive and expose the several vent plug bosses and other openings exposing the several cell terminals for testing purposes, integral upstanding annular flangs formed on said outer cover to embrace said bosses, and pendant flanges formed and arranged on said panel to penetrate said bodies of sealing compound and by adhesion thereto to fasten said panel on the battery, said pendant flanges extending substantially continuously around the top of each cell and having downwardly converging contact surfaces terminating in sharp lower edges adapted to be pressed into the continuous marginal bodies of sealing compound around each cell, to thereby securely fasten said outer cover in place on the battery.

FRANK M. BROWN.
CARL F. ALBRECHT.

REFERENCES CITED

The following references are of record in the file of this patent:

UNITED STATES PATENTS

| Number | Name | Date |
| --- | --- | --- |
| 1,374,506 | Hunt | Apr. 12, 1921 |
| 1,847,214 | Hebbler | Mar. 1, 1932 |
| 2,186,148 | Raney | Jan. 9, 1940 |